Patented July 4, 1950

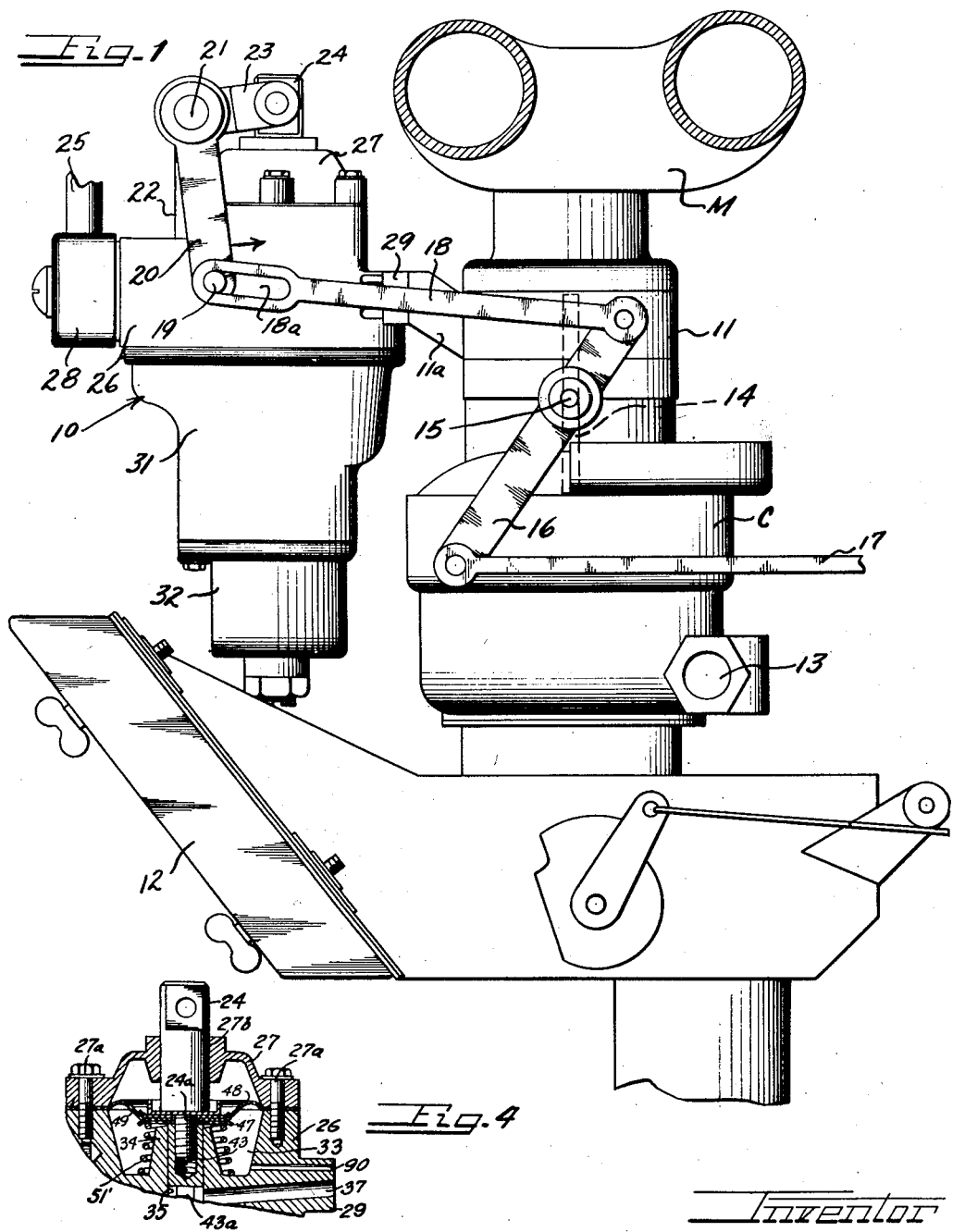

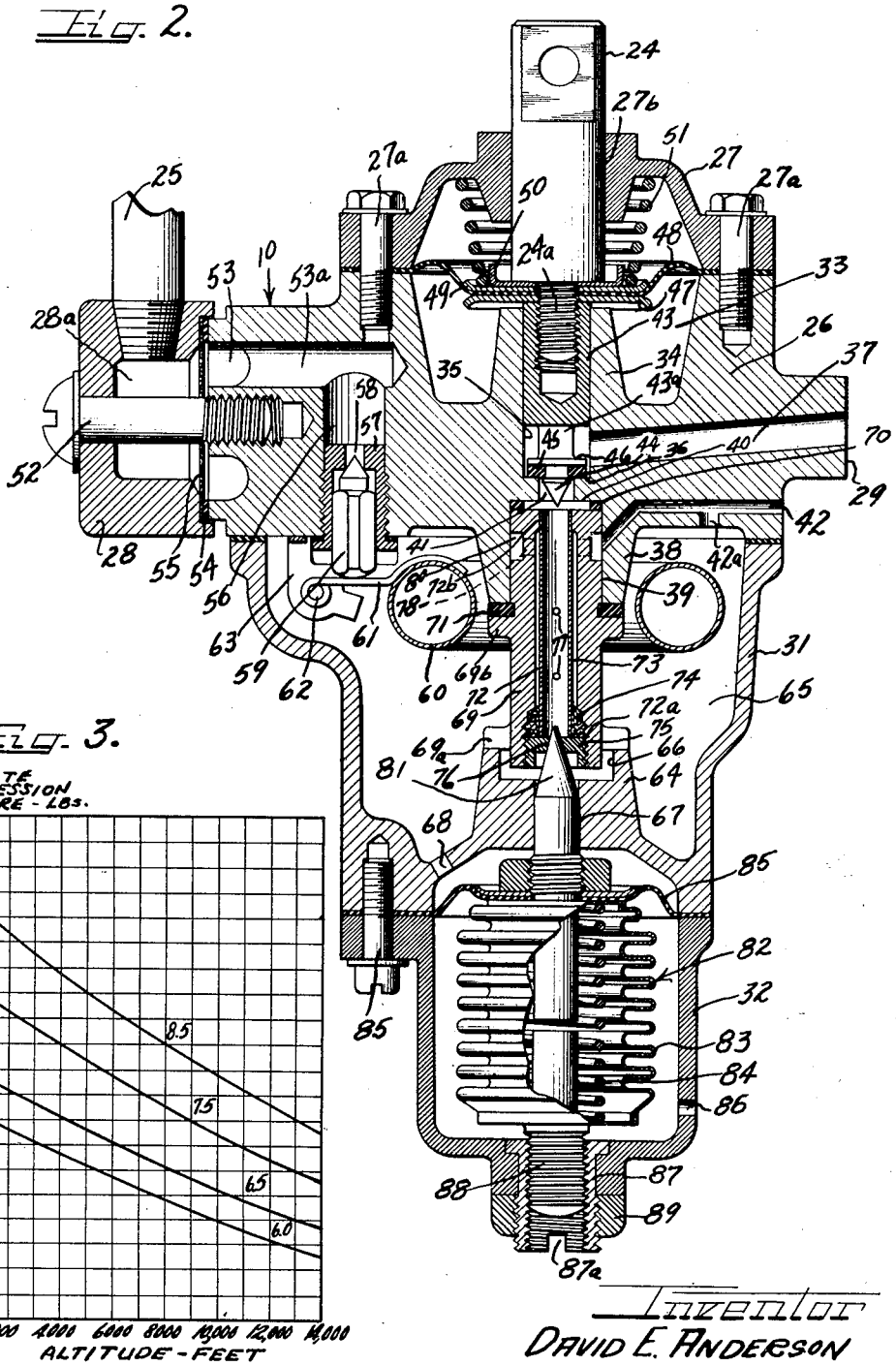
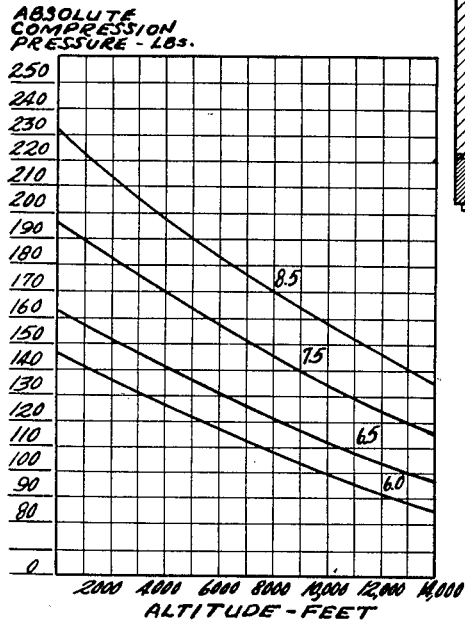

2,513,775

UNITED STATES PATENT OFFICE 2,513,775

BAROMETRIC PRESSURE SENSITIVE ENGINE DETONATION SUPPRESSOR

David E. Anderson, Cleveland, Ohio, assignor to Thompson Products, Inc., Cleveland, Ohio, a corporation of Ohio Application June 21, 1946, Serial No. 678,507

5 Claims. (Cl. 123—127)

This invention relates to devices and methods for feeding antiknock fluids, such as alcohol and water, to the intakes of internal combustion engines in accordance with the demand of the engine at varying altitudes. Specifically the invention relates to a supplementary fuel injector for throttle actuated internal combustion engines which is sensitive to the throttle setting and the ambient air conditions in which the engine is operating.

Detonation in an internal combustion engine usually increases with engine speed up to a speed that varies with different engines and then decreases and disappears. Detonation also increases with increased absolute pressures in the engine and engines with high compression ratios are subject to increased detonation. Since the absolute pressure in an engine varies in accordance with the ambient air pressure surrounding the engine and decreases when ambient air pressures decrease, the detonation tendencies of the engine lessen as ambient air pressures decrease.

If expensive auxiliary detonation suppressor liquids such as alcohol are used for suppressing the detonation of an internal combustion engine, it is most economical to feed these liquids only when actually needed and in amounts that are just sufficient to suppress detonation.

The present invention provides a detonation suppressor for internal combustion engines which is not only sensitive to the throttle setting of the engine to feed supplementary antiknock material to the engine only when needed to suppress detonation but also sensitive to barometric pressure for decreasing the rate of feed as air pressures surrounding the engine decrease. The device of this invention is equipped with an aneroid actuated valve and a valve responsive to the throttle setting of the engine. The first mentioned valve determines the rate of antidetonant feed with relation to ambient air conditions. The second valve determines the time and rate of antidetonant feed with relation to the throttle setting. The aneroid control is an added economizer for the throttle control.

It is then an object of this invention to provide a barometric pressure sensitive engine detonation suppressor.

A further object of the invention is to provide an aneroid controlled antidetonant injector for internal combustion engines.

A still further object of the invention is to provide a supplementary liquid feed device for the intakes of internal combustion engines which meters auxiliary liquid to the engine in accordance with ambient air pressure and throttle setting.

A still further object of the invention is to provide a supplementary fuel injector for the intakes of internal combustion engines which has a feed passageway vented to the atmosphere and equipped at opposite ends with metering valves respectively controlled by the throttle setting of the engine and pressure of the ambient air surrounding the engine.

A still further object of the invention is to provide a supplementary fuel injector for the intakes of internal combustion engines which has an upstanding ported flow tube vented along its length to the atmosphere and equipped with orifices at opposite ends thereof together with an aneroid actuated metering valve controlling flow through the bottom orifice and a second metering valve controlling flow through the top orifice and responsive to the throttle setting of the engine.

Other and further objects of the invention will be apparent to those skilled in the art from the following detailed description of the annexed sheets of drawings which, by way of a preferred example only, illustrate one embodiment of the invention.

On the drawings:

Figure 1 is a side elevational view of a detonation suppressor or auxiliary liquid injector according to this invention mounted between the carburetor and intake manifold of an internal combustion engine.

Figure 2 is a vertical cross sectional view of the detonation suppressor or auxiliary liquid injector of this invention.

Figure 3 is a chart illustrating the effect of altitudes upon absolute pressure in internal combustion engines having several different compression ratios.

Figure 4 is a fragmentary vertical cross sectional view of a portion of the detonation suppressor of this invention showing a modification of the metering valve control member of this invention.

As shown on the drawings:

As shown in Fig. 1 the device 10 of this invention is mounted on a flange unit or block 11 which is interposed between the carburetor C and the intake manifold M of an internal combustion engine such as an aircraft engine. The carburetor C has an air inlet scoop 12 and a main fuel inlet 13. Admixed air and main fuel in proper proportion are fed by the carburetor C to the intake manifold M in accordance with the setting of the throttle valve 14 which as shown in dotted lines is positioned in the discharge end of the carburetor and is mounted on an actuating shaft 15. The mounting block or flange 11 is beyond the throttle 14.

As is known, when the throttle 14 is opened vacuum in the intake manifold M decreases so that the throttle setting has a direct influence upon the degree of vacuum existing in the intake manifold. A throttle lever 16 is fulcrumed on the shaft 15 and is actuated by a control rod 17 which shifts the throttle between its open and closed positions. A link 18 is pivoted to the arm or lever 16 at the end thereof remote from the rod 17. This link 18 has an elongated slot 18a in the end thereof receiving a pin 19 on an arm 20 depending from a rock shaft 21 journaled on a bracket 22 on the device 10. The rock shaft 21 also carries an arm 23 which is pivoted to a rod 24 projecting from the top of the device 10. This arrangement provides for the lifting of the rod 24 only when the throttle valve 14 approaches the full open position as shown in Fig. 1.

Thus when the rod 17 is pushed to rock the shaft 15 in a clockwise direction for opening the throttle valve 14, the link 18 is pulled to the right thereby pulling the arm 20 and rocking the shaft 21 in a counterclockwise direction to raise the arm 23 and rod 24. The slot 18a and pin 19 provide a lost motion connection that will not cause movement of the rod 24 until the throttle valve 14 is nearing the full open position.

The device 10 receives auxiliary detonation suppressing liquids, such as water, alcohol, or a mixture of alcohol and water, through a tube 25 and meters this liquid through a boss 11a on the mounting flange or block 11 to the intake of the engine for admixing with the main fuel being fed to the engine intake by the carburetor.

As shown in Fig. 2 the device 10 includes a multi-part casing or housing with a head or main body portion 26, a cover or cap 27 secured on top of the head 26, an inlet boss 28 secured on one side of the head 26, a flange 29 on the other side of the head 26 for attachment to the boss 11a of the mounting bracket 11 shown in Fig. 1, a cup-like member 31 secured to the bottom face of the head 26 and a second cup member 32 secured to the bottom of the cup member 31.

As shown in Fig. 2 the head 26 has a well 33 extending inwardly from the top face thereof. An upstanding boss 34 is provided in the center of the well 33. A bore 35 is formed through the boss 34 and extends into the head to a shoulder 36 as a level below the bottom of the well 33. A bore 37 extends laterally from the bore 35 adjacent the shoulder 36. This bore 37 provides an outlet passageway which communicates with the interior of the mounting boss 11a of the block or flange 11.

The head member 26 has a boss 38 depending from the bottom face thereof and containing a bore 39. The bore 39 terminates at a shoulder 40 in spaced relation beneath the shoulder 36. An orifice or connecting passageway 41 is provided between the shoulders 36 and 40.

Bores 42 connect the bore 39 beneath the shoulder 40 with the outside atmosphere and as shown open through the side face of the head 26 beneath the flange 29. A branch bore 42a communicates with the bore 42 through the bottom face of the head within the cup casing 31.

A valve assembly is provided in the bore 35 and is composed of a shaft or stem 43 slidably engaging the side wall of the bore and having a reduced diameter 43a at the inner end of the bore carrying a pointed end 44 fitting in the orifice 41 and coacting therewith to provide a needle valve for the orifice. A sealing ring 45 is carried around the reduced portion 43a and held between the pointed end 44 and a shoulder 46 to seat on the shoulder 36 for sealing the orifice 41.

The top of the stem member 43 projects above the boss 34 and receives a washer 47 thereover. A diaphragm 48 overlies the washer 47 and is clamped around its peripheral margin between the head 26 and cap or cover 27 by means of bolts 27a mounting the cover on the head. A second washer 49 opposes the washer 47 and the central portion of the diaphragm 48 is disposed between the two washers. The rod 24 is slidably mounted in a cylindrical boss portion 27b of the cover 27 and has a threaded inner end 24a threaded into the stem member 43. A spring guide 50 is mounted on top of the washer 49 and clamped thereagainst by the shoulder provided on the bottom of the rod 24. A helical spring 51 is mounted in the cap 27 and held under compression between the washer 49 and the top of the cap to act through the diaphragm 48 on the stem member 43 for urging the sealing washer 45 against the shoulder 36. Raising of the rod 24 through the linkage from the throttle of the carburetor compresses the spring 51 and lifts the sealing washer 45 off of its seat to permit the pointed end 44 of the valve assembly to meter fluid through the orifice 41 into the outlet passageway provided by the bore 37.

The inlet boss member 28 is secured on a flat side face of the head 26 by means of a single bolt 52. This flat side face of the head 26 has an annular groove 53 therearound surrounded by a gasket 54 and covered with a flat screen 55 which is interposed between the boss 28 and the gasket. The bolt 52 tightens the boss 58 against the side face of the head to clamp the screen in position and to seal the boss relative to the head. The boss 28 has a chamber 28a receiving liquid from the inlet tube 25. This liquid is filtered through the screen 55 into the groove 53 and the groove 53 is connected to an inlet bore 56 by means of a bore 53a extending from the groove as shown. The inlet bore 56 opens through the bottom face of the head 26 and receives a valve plug 57 in threaded relation therein. The plug 57 has an orifice 58 therein controlled by a slidable needle valve 59. An annular float 60 is provided in the cup casing 31 around the boss 38 of the head 26 and actuates an arm 61 on which the valve 59 rests. The arm 61 is pivoted on a pin 62 carried by a bracket 63 depending from the head 26. Raising of the float by liquid in the cup casing 31 moves the valve 59 upwardly to close the orifice 58.

The cup casing 31 has an upstanding boss 64 on the bottom thereof extending into the central portion of the chamber 65 defined by the casing. The upper end of this boss 64 is recessed at 66 and a bore 67 extends through the boss from the bottom of the recess 66 through the bottom wall of the casing. The bottom wall of the casing is provided with a vent hole or aperture 68 along side of the boss 64.

A tubular fitting 69 is inserted in the bore 39 of the boss 38 and is bottomed against a sealing washer 70 which is seated on the shoulder 40. The fitting 69 is held up in the bore 39 by legs 69a which rest on the boss 64 of the cup casing 31. The fitting 69 has a flange 69b underlying the boss 38 and providing a shoulder for supporting a second sealing washer 71 in sealed engagement against the bottom of the boss.

A cylindrical bore 72 extends vertically through the fitting 69 and has an enlarged internally threaded lower end portion 72a together with a reduced diameter upper end portion 72b. A vent tube 73 fits freely in the bore 72 in spaced relation therefrom and has its upper end snugly seated in the reduced portion 72b. The lower end of the tube 73 projects into the threaded counterbore 72a and is surrounded by packing material 74. A plug 75 is threaded into the bore 72a in sealed engagement with the packing material 74. This plug provides an orifice 76 giving access to the lower end of the tube 73. The tube 73 has port holes 77 at spaced intervals along its length. The top port hole 77 is located slightly below the liquid level in the float chamber 65. Ports 78 are provided in the upper end of the fitting 69 and connect the upper end of the bore 72 with a groove 80 surrounding the fitting in the bore 39 and communicating with the atmospheric vent through the passageway afforded by the bores 42. The interior of the tube 73 is thereby vented to the atmosphere through the holes 77, bore 72, ports 78, groove 80, and bores 42 when the liquid in bore 72 has been lowered beneath the top hole 77 by suction from the manifold.

A needle valve 81 is slidably mounted in the bore 67 of the boss 64 and has a pointed end projecting through the recess 66 and plug 75 to control flow through the orifice 76. The needle valve 81 therefore regulates flow of liquid from the chamber 65 of the cup casing 31 into the bottom end of the vent tube 73. The needle valve 81 is actuated by an aneroid 82 in the cup casing 32. This aneroid 82 includes an evacuated bellows 83 housing a compression spring 84 and acting through a diaphragm 85 on the needle valve 81. The diaphragm 85 has its peripheral margin sealingly clamped between the bottom of the casing 31 and the top of the casing 32 by means of bolts 85 which connect the casting 32 to the casing 31. The interior of the casing 32 is vented to the ambient air by means of a vent hole 86.

The bottom of the casing 32 rotatably supports a thimble 87 receiving a threaded pin 88 in threaded relation therein. The pin 88 is fixed to the bottom of the aneroid 82. The thimble 87 has a screw driver slot 87a in the bottom end thereof and can be rotated to shift the pin 88 for changing the initial setting of the aneroid thereby controlling the initial position of the needle valve 81. The thimble is exteriorly threaded and is locked in adjusted position by means of a lock nut 89.

As shown in Fig. 2 the spring 51 is mounted on top of the diaphragm 48 and urges the valve assembly 43 into closed position. Shifting of the throttle will raise the rod 24 against the action of the spring 51 to open the valve assembly in accordance with the throttle setting. Alternately as shown in Fig. 4, the setting of the valve assembly can be controlled by the degree of vacuum in the intake manifold and the throttle linkage can be eliminated. In such event the spring 51 is merely shifted from its position above the diaphragm to the position indicated by 51' in the well 33. In this position the spring acts to urge the valve assembly toward open position. The well 33 is connected through a passageway 90 in the head 26 with the source of vacuum in the intake manifold and as the degree of suction in the manifold increases due to a closed throttle setting, the diaphragm 48 will be drawn down into the well 33 for closing the valve assembly 43. This alternate arrangement can be used in place of the throttle linkage control without changing the function of the device since the position of the throttle controls the degree of vacuum in the intake manifold and the valve assembly 43 can be actuated directly with the throttle or indirectly through the action of vacuum controlled by the throttle.

*Operation*

Antidetonating material, such as a 50% water-alcohol mixture, is fed by gravity or under pump pressure through the tube 25 to the inlet boss 28. The liquid is filtered by the screen 55 and flows through the passageway 53a to the orifice 58. The liquid is then admitted to the float chamber 65 under the influence of the float controlled valve 59 and is maintained at a fixed level in the float chamber. Liquid in the float chamber flows by gravity through the orifice 76 into the tube 73 and will rise to a level in the tube 73 consistent with the level in the float chamber 65 whenever the engine is stopped, provided of course the needle valve 81 is held in an open position by the aneroid 82. In the stopped position of the engine the throttle setting is such that the valve assembly 43 will be closed and the sealing washer 45 will be seated on the shoulder 36. When the engine is running the throttle is opened and the rod 24 is raised at the desired time to open the valve assembly and unseat the sealing washer 45 thereby connecting the top of the tube 73 with the intake manifold through the passageway afforded by the bore 37 and the passages in the mounting flange 11. Liquid will thereupon be drawn by suction into the intake manifold and air will be vented into the manifold with the liquid so that a jet or spray of liquid will be supplied. The venting of air into the tube 73 supplies additional air to the manifold for proper control of the antidetonating material and provides for the temporary enrichment of the mixture to give an extra shot of relatively solid auxiliary liquid to the intake of the engine when the flow of liquid first starts. Thus the tube 73 will fill with liquid when the engine is idle and this solid column of liquid will be drawn into the intake before the air flows through the ports to break up the column of liquid into a jet or spray. The valve assembly 43 meters the auxiliary air and liquid jet or spray to the intake manifold under the influence of the throttle setting. Since detonation occurs as the vacuum in the intake manifold decreases and the throttle setting changes to a wide open setting, the metering valve being sensitive to the throttle setting will meter the auxiliary fluid to the engine in the proper quantities at the proper time.

When the throttle setting is such that the metering valve is closed even when the engine is running, the air vent through the tube 73 will be sealed by the metering valve and the fuel flow from the carburetor setting will not be influenced.

Detonation is influenced by absolute compression pressure in the engine according to the following formula:

$$P_c = P_a \left(\frac{V}{V_c}\right)^{1.3}$$

$P_c$ = absolute compression pressure
$P_a$ = pressure of the atmosphere
$V$ = volume of compressed space
$V_c$ = total volume of space before compression It follows that atmospheric pressure or pressure of the ambient air fed to the engine has a definite influence on detonation. Therefore to further economize upon the use of antidetonant material, the aneroid control of this invention decreases the rate of auxiliary liquid fed to the engine upon decrease in barometric pressure. The evacuated bellows 83 will expand as pressures in the casing 32 decrease. Expansion of this bellows closes the needle valve 81 to restrict flow through the orifice 76. The casing 32 is shown as vented to the atmosphere through the port 86 but if a supercharger is used the casing 32 can be exposed to supercharger pressure instead of atmospheric pressure.

The chart of Fig. 3 illustrates the manner in which the absolute compression pressures of engines decrease as the engines operate at increasing altitudes. The four curves respectively indicate engine operation of engines having different compression ratios as indicated on each curve. The engine with the 8.5 compression ratio showed a more pronounced decrease in compression pressure as altitude was increased. This indicates that detonation increases somewhat with increase in compression ratio. However, irrespective of the compression ratios used the chart shows wherein compression pressures diminish as altitude increases. Diminished compression pressures mean less detonation and less necessity for antidetonating material.

The chart also shows that compression pressures at high altitudes in the higher compression ratio engines are the same as compression pressures at lower altitudes in the lower compression ratio engines. Thus, for example, the compression pressure at 9000 ft. altitude for the 8.5 to 1 compression ratio engine is the same as when the 6.5 to 1 compression ratio engine is operated at sea level.

The 8.5 to 1 compression will be too high for smooth operation at sea level and appreciable amounts of antidetonant must be fed to the engine. As altitude is increased, the required amount of antidetonant is progressively reduced and when an altitude of 9000 ft. or higher is reached there may be no need for any feeding of antidetonant to the engine. Thus the aneroid can be calibrated to completely stop the flow of antidetonant at such altitudes.

The aneroid 82 is therefore set in accordance with the compression ratio of the engine and is exposed to either ambient air or supercharger air depending upon whether or not the carburetor of the engine receives air directly from the atmosphere or from a supercharger. As pressure on the aneroid decreases due to decreased ambient air pressure at increasing altitudes the aneroid will expand to close the valve 81 and decrease the rate of feed of antidetonant. Should the engine be operated at altitudes wherein the valve 81 is closed but wherein the throttle setting is such as to open the valve assembly 43 then air will be drawn through the tube 73 into the carburetor to act as an economizer. Whenever the throttle setting is such that the valve assembly 43 is closed, however, no air can be drawn into the engine through the tube 73 because the valve 43 is on the discharge end of the tube.

From the above descriptions it will be understood that the invention provides an efficient injector or feed device for supplying antidetonating material to an engine in amounts and at times influenced by the throttle setting of the engine and the altitude at which the engine is operated.

I have shown a practical and efficient embodiment of the features of my invention but I do not desire to be limited to the exact construction, arrangement or operation as shown and described as changes and modifications are possible without departing from the scope of the invention as defined by the appended claims.

I claim as my invention:

1. An antiknock fluid feed device for the intake of an internal combustion engine comprising a housing defining a float chamber, a float controlled inlet in said housing for supplying antidetonant material to the float chamber, said housing having a discharge passageway extending upwardly from the lower portion of the float chamber and vented to the atmosphere at its upper end, a ported tube extending through said passageway arranged to receive air from said passageway, orifice means at the ends of said tube respectively connecting the tube with the float chamber and with the engine intake, valves controlling flow through said orifice means, a barometric pressure responsive device actuating the valve controlling flow into the lower end of the tube from the float chamber, and means responsive to the throttle setting of the engine for actuating the other valve whereby antiknock fluid is fed to the engine in accordance with the engine throttle demand and the air pressure surrounding the engine.

2. A fluid feed device for throttled intakes of internal combustion engines comprising a liquids chamber, a discharge passageway extending upwardly from said chamber, a first valve for controlling flow from the chamber into the passageway, a barometric pressure responsive unit actuating said first valve and arranged to progressively close the valve as barometric pressure is decreased, a second valve controlling flow out of the top of the passageway, means responsive to the setting of the engine throttle for actuating the second valve and arranged to progressively open the second valve as the throttle is opened, and an atmospheric air vent in said passageway between said valves.

3. A supplementary fuel injector for internal combustion engines comprising a head casing having a mounting flange on the side thereof for attachment to a flange unit, a cover on said head casing cooperating therewith to provide a chamber, a metering valve in said head casing, a rod for actuating said valve slidably mounted in said cover, a spring in said cover urging said valve toward closed position, an intake valve in said head casing, a cup-shaped casing mounted on the bottom of said head casing and defining a float chamber, a float in said chamber actuating said intake valve to admit supplementary fuel to the float chamber, an aneroid mounted on said cup casing, a second valve actuated by said aneroid for controlling flow to said first valve, and a vent tube defining a passageway between said valves vented to the atmosphere.

4. A fluid injector for an internal combustion engine comprising a multi-part casing having a mounting flange, a flange unit adapted to be inserted between the intake manifold and carburetor of an internal combustion engine secured to the mounting flange of said casing, said casing having a float chamber therein and an upstanding discharge passageway extending from the bottom of the float chamber to the level of said flange, an aneroid actuated valve controlling flow into the lower end of the passageway, and a valve under the influence of the throttle setting of the engine controlling flow out of the upper end of the passageway.

5. A fluid feed device comprising a head casing with a side mounting flange and interconnected passageways through the flange and top and bottom ends of the head casing, a valve assembly slidable in the portion of the passageway extending through the top of the head casing and regulating flow into that portion of the passageway extending through said mounting flange, a tubular fitting seated in the portion of the passageway extending through the bottom of said head casing, an atmospheric vent for the interior of said tubular fitting, a ported tube seated in said tubular fitting discharging out of its upper end to said valve assembly, a cup-shaped casing holding said tubular fitting in said passageway, a float controlled valve in said cup casing regulating flow into the cup casing, and an aneroid actuated valve connecting the lower portion of the cup casing with the bottom end of the tube for controlling feed of fluid into the bottom end of the tube.

DAVID E. ANDERSON.

REFERENCES CITED

The following references are of record in the file of this patent:

FOREIGN PATENTS

| Number | Country | Date |
|---|---|---|
| 429,682 | Great Britain | June 4, 1935 |